United States Patent
Polak et al.

[11] 3,885,923
[45] May 27, 1975

[54] GENERATION OF CURVED SURFACES ON A WORKPIECE

[75] Inventors: Leo F. Polak, Van Nuys; Bernard E. Kalensher, Altadena, both of Calif.

[73] Assignee: Xerox Corporation, Stamford, Conn.

[22] Filed: Apr. 11, 1974

[21] Appl. No.: 460,256

[52] U.S. Cl. .................................. 51/33 W; 51/284
[51] Int. Cl. ........................................... B24b 13/00
[58] Field of Search .......... 51/32, 33 R, 33 W, 284; 33/27 R, 27 M, 27 K

[56] References Cited
UNITED STATES PATENTS

| | | | |
|---|---|---|---|
| 467,580 | 1/1892 | Lundstrom | 33/27 M |
| 576,349 | 2/1897 | Mallard | 33/27 M |

FOREIGN PATENTS OR APPLICATIONS

| | | | |
|---|---|---|---|
| 9,942 | 6/1892 | United Kingdom | 51/33 W |
| 615,649 | 1/1949 | United Kingdom | 51/33 W |
| 648,776 | 1/1951 | United Kingdom | 51/33 W |

Primary Examiner—Al Lawrence Smith
Assistant Examiner—K. J. Ramsey

[57] ABSTRACT

Method and apparatus for performing a plurality of operations on a workpiece without the necessity of removing the workpiece after each operation, in which a template is provided, the curved border of which is shaped in accordance with the contour desired to be formed on a workpiece. An elongated, flexible member is fastened at a point on one side of the template and is pulled taut around a corner on the other side of the template. The length of the member is such that when the member is pulled around the corner of the template, the member will contact the curved border of the template. As the free end of the flexible member, having a surface generating member attached thereto, is moved in a direction away from the curved border of the template (the member being maintained taut) and in contact with a workpiece, the desired contour is generated on the workpiece.

6 Claims, 4 Drawing Figures

1

GENERATION OF CURVED SURFACES ON A WORKPIECE

BACKGROUND OF THE INVENTION

Prior art techniques for generating curved surfaces on a workpiece include the utilization of a one-to-one template on a tracer-type apparatus as disclosed, for example, in U.S. Pat. No. 2,995,876, and the utilization of computer generated punched tape on numerically controlled apparatus being adapted to respond to the commands formulated on the punched tape. In the use of tracer apparatus, the surface generating member (a cutter, for example) is driven by a servo control system which receives its input from a follower in contact with the template. The cutting tool is directly controlled in a manner whereby the surface generated corresponds to the surface of the template. In the numerically controlled apparatus, the surface generating member is driven by a servo control which receives its input from a punched tape generated either by computer or by hand depending on the complexity of the surface to be generated.

The aforementioned surface generating apparatus have numerous advantages associated therewith. For example, although the punched tape is capable of controlling a plurality of machine functions, the method is generally limited to high volume or production items due to the relatively high expense. As to the tracer apparatus, the tracer template must be as accurate as the required accuracy of the surface to be generated. Every defect, whether an indentation or a burr, is reproduced by the tracer apparatus.

The aforementioned U.S. Pat. No. 2,995,876 to Frick exemplifies a typical prior art tracer apparatus and discloses an automatic glass edging machine which may be arranged to perform dual operations. In this arrangement, the machine carries a rough and fine edging wheel arranged to follow in tandem about a glass workpiece so that rough and final grinding may take place with one handling of the workpiece. Although the concept in the Frick patent broadly discloses the concept of employing a single machine for grinding and finishing operations, the apparatus utilized is relatively complex and expensive, requiring, inter alia, at least two tracer wheels and the equipment necessary to support each additional tracer wheel.

SUMMARY OF THE PRESENT INVENTION

The present invention provides method and apparatus for performing a plurality of operations on a workpiece without the necessity of removing the workpiece after each operation.

In particular, a template is provided, the curved border of which is shaped in accordance with the contour desired to be formed on a workpiece. An elongated, flexible member is fastened at a point on one side of the template and is pulled taut around a corner on the other side of the template. The length of the member is such that when the member is pulled around the corner of the template, the member will contact the curved border of the template.

As the free end of the flexible member, having a surface generating member attached thereto, is moved in a direction away from the curved border of the template (the member being maintained taut) and in contact with a workpiece, the desired contour is generated on the workpiece. A plurality of operations can be performed on the workpiece by alternating the surface generating member attached to the free end of the flexible member. For example, in order to generate, grind and polish the workpiece contour, the surface generating member provided is, respectively, a coarse grinding wheel, a finer grade grinding wheel, and finally ending with a buffing or polishing wheel.

It is an object of the present invention to provide method and apparatus for generating a desired contour on a workpiece.

It is a further object of the present invention to provide method and apparatus for performing a plurality of operations on a workpiece without removing the workpiece from the apparatus.

It is still a further object of the present invention to provide method and apparatus for performing a plurality of operations on a workpiece, including the generation, grinding and polishing of a desired contour on the workpiece inexpensively and without removing the workpiece from the apparatus for each operation.

It is a further object of the present invention to provide simplified apparatus for performing a multiplicity of operations on a workpiece, said apparatus including a template having curved surface shaped to contour to be generated on said workpiece, a flexible, elongated member which is operated in conjunction with said template and having one end affixed to the template surface and a plurality of shaping members each capable of being mounted on the free end of the flexible member for performing said operations on the workpiece.

DESCRIPTION OF THE DRAWINGS

For a better understanding of the invention, as well as other objects and further features thereof, reference is made to the following description which is to be read in conjunction with the accompanying drawings wherein.

DESCRIPTION OF THE PREFERRED EMBODIMENT

Figure 1:
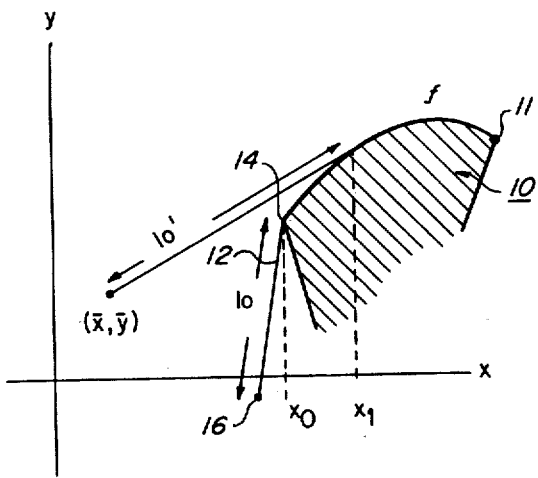
FIG. 1 is a graphical representation illustrating the mathematics of the present invention applied to a template of arbitrary shape.

For a better understanding of the underlying concept involved in the development of the present invention, the mathematical procedures associated therewith will first be discussed. In particular, referring to FIG. 1, a relatively flat, arbitrarily shaped template 10 is illustrated. The template 10 lies in the X-Y plane (plane of the drawing) and the curved surface, or border, of the template is described by the function $y = f(x)$. An elongated, flexible member 12, such as a string or wire cable and having the capability of being maintained taut (i.e., flexible member 12 is required not to change length) is fastened at a point 11 on the template 10 and is pulled taut around the sharp corner 14 of template 10. The length of the flexible member 12 is chosen to be at least equal to the length of the curved surface of template 10. When flexible member 12 is pulled around corner 14 of template 10, the entire length of flexible member 12 will be in contact with template 10 except for a predetermined length $l_o$, the x coordinate of the sharp corner being denoted by $x_0$.

As the free end of flexible member 12 is then moved upward and towards the left, i.e., away from the curved surface of template 10 while maintaining flexible member 12 taut, the straight-line segments of the flexible member 12 will become tangent to $f(x)$ at successive points on the template surface. In FIG. 1, $x_1$ denotes the x coordinate of the point of tangency for segment $l_o'$. The x and y coordinates of free end 16 of the segment as it is moved are denoted by $\bar{x}\,\bar{y}$, respectively. The free end 16, it should be noted at this point, will ultimately perform the multiplicity of operations described hereinabove, i.e., the generation, grinding and polishing of a contour on a workpiece. A mathematical relationship exists between $(\bar{x}\,\bar{y})$ and $f(x)$. Thus, for a given function $f(x)$ and given values of $x_o$ and $l_o$, the coordinates $\bar{x}\,\bar{y}$ of the free end 16 of taut, flexible member 12 can be expressed as a function of the point of tangency, $x_1$, according to:

$$\bar{x} = x_1 - \frac{l_o + \int_{x_o}^{x_1} [1 + f'^2(x)]^{1/2}\,dx}{[1 + f'^2(x_1)]^{1/2}} \quad (1)$$

$$\bar{y} = f(x_1) - \frac{f'(x_1)}{[1 + f'^2(x_1)]^{1/2}} \left\{ l_o + \int_{x_o}^{x_1} [1+f'^2(x)]^{1/2}dx \right\} \quad (2)$$

Figure 2:
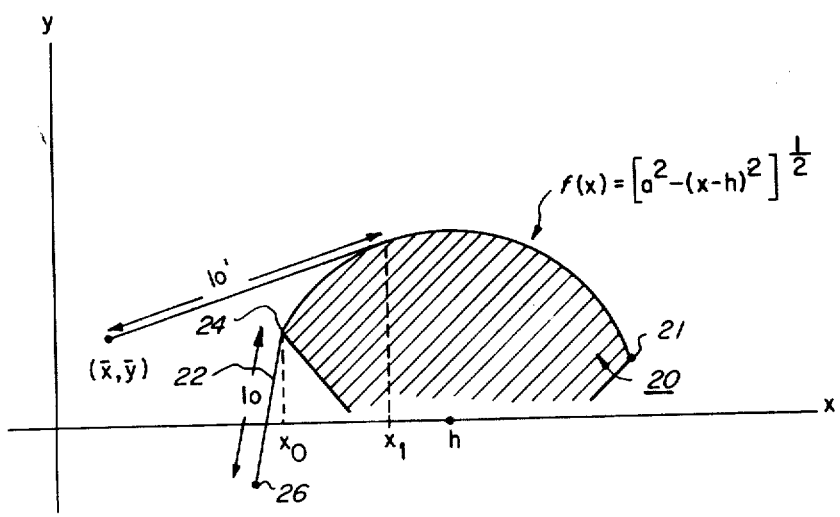
FIG. 2 is a graphical representation illustrating the mathematics of the present invention applied to a circular template.

FIG. 2 illustrates an example whereby the surface of template 20 is considered to be part of a circle whose center lies on the x axis ($x = h$, $y = o$) and whose radius is $a$. The equation of the curved surface is given by:

$$f(x) = [a^2 - (x-h)^2]^{1/2} \quad (3)$$

Substituting equation (3) into equations (1) and (2) results in the following equation for $\bar{x}, \bar{y}$:

$$\bar{x} = x_1 - \frac{1}{a}[a^2-(x_1-h)^2]^{1/2}\left\{ l_o + a[\sin^{-1}(\frac{x_1-h}{a}) - \sin^{-1}(\frac{x_o-h}{a})] \right\} \quad (4)$$

$$\bar{y} = [a^2-(x_1-h)^2]^{1/2} + \frac{(x_1-h)}{a}\left\{ l_o + a[\sin^{-1}(\frac{x_1-h}{a}) - \sin^{-1}(\frac{x_o-h}{a})] \right\} \quad (5)$$

The equations for $\bar{x}$ and $\bar{y}$, the coordinates of free end 26 of flexible member 22 as it is moved away from the curved surface of template 20 corresponds to a contour which is, as will be explained hereinafter, traced on a workpiece mounted adjacent to template 20.

Figure 3:
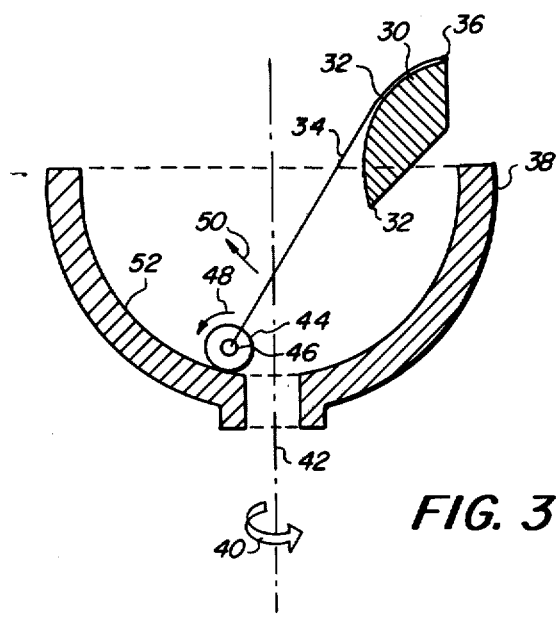
FIG. 3 illustrates a first embodiment wherein a first contour is generated on a workpiece.

FIG. 3 illustrates the contour generated on a workpiece utilizing the circular template shown in FIG. 2.

In particular, template 30 having a circular portion 32, has one end of flexible member 34 affixed to point 36 thereon. It should be noted that the template surface need not have a sharp corner. However, flexible member 34 should at least be affixed at the extreme end of the template surface (point 36 in FIG. 3) although it may be affixed at a point external of the extreme end. The template 30 is positioned adjacent workpiece 38 which may comprise a metallic member, such as chromium, to be fabricated into an optical reflector, for example. It should be noted that other devices can be fabricated using the techniques of the present invention, including, for example, a mandrel to be utilized in the electroforming process and that the workpiece may comprise materials other than metal, such as glass. The workpiece 38 is mounted upon a rotating fixture (not shown) which causes the workpiece 38 to rotate in the direction of arrow 40 centered about center line 42, rotation of the workpiece being necessary in order to produce a three-dimensional contour from a two-dimensional template. A shaping member, such as a coarse grinding wheel 44, is affixed to the free end 46 of elongated member 34, grinding wheel 44 being caused to rotate in the direction of arrow 48 by a motor (not shown).

In operation, the template 30, having elongated member affixed to point 36, is positioned adjacent workpiece 38 and held by a support member (not shown), the workpiece then being caused to rotate. As the elongated member is unwound from the surface of template 30 (either manually or by a mechanical device, such as a spring loaded device positioned in a groove or held between two vertical plates), while being maintained taut in the direction of arrow 50, the contour 52 is generated on the inner surface of workpiece 38.

In accordance with the teachings of the present invention, after the initial contour 52 is cut by the coarse grinding wheel 46, the wheel can be replaced to finer grades of grinding wheels and finally ending with a buffing or polishing wheel without removing the workpiece from its supporting fixture (not shown). In other words, the present invention provides a technique for cutting, polishing, and grinding a contour.

The elongated flexible member 34 can be affixed to the template 30 and surface generating member 46, by an adhesive, or by mechanical bonding means.

Figure 4:
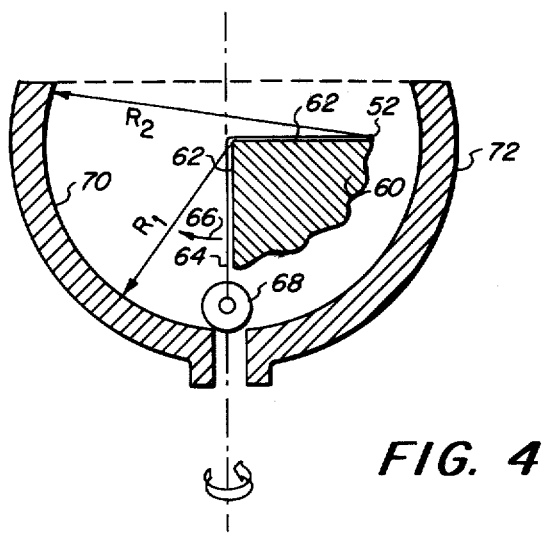
FIG. 4 illustrates a second embodiment wherein a second contour is generated on a workpiece.

FIG. 4 illustrates the contour generated by using a template having a rectangular shaped curved surface 62. As with reference to FIG. 3, elongated member 64, maintained taut at all times, and affixed to point 66 on template 60, is moved in the direction of arrow 66, shaping member 68, affixed to the free end of member 64, generates surface 70 on the inside surface of rotating workpiece 72. As the flexible member 64 is moved from template 60, the effective, or curve generating length of the flexible member, changes from a radius of $r$, to a radius of $r2$ at the time the member is directly opposite to the horizontal surface 62 of template 60. As with reference to FIG. 3, the shaping member 68 can be changed to perform a plurality of operations, such as generation, grinding and polishing, sequentially, without requiring the removal of workpiece 72 from its fixture (not shown).

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A method for generating a predetermined contour on a surface of a workpiece supported on a member comprising the steps of:
   providing a template having a curved surface which corresponds to the contour to be generated on the surface of said workpiece, an elongated flexible member being affixed to one end of said template curved surface and extending along the curved surface, a first contour forming member being affixed to the other end of said elongated member,
   moving said contour forming member into contact with a surface of said workpiece, and
   moving said elongated member in a direction away from said curved surface of said template while maintaining said elongated member in an extended position and while said workpiece is rotated, whereby said predetermined contour is generated on said workpiece surface.

2. The method as defined in claim 1 wherein the length of said elongated member is at least equal to the length of said curved template surface.

3. The method as defined in claim 2 further including the steps of removing said first contour forming member and affixing a second contour forming member to the free end of said elongated member without removing said workpiece from said support member.

4. The method as defined in claim 3 further including the steps of removing said second contour forming member and affixing a contour polishing member to the free end of said elongated member without removing said workpiece from said support member.

5. Apparatus for generating a predetermined contour on a surface of a workpiece supported on a member comprising:
   a template having a curved surface which corresponds to the contour to be generated on the surface of said workpiece, an elongated flexible member being affixed to one end of said template curved surface and extending along the curved surface, a first contour forming member being affixed to the other end of said elongated member,
   means for rotating said workpiece,
   means for moving said contour forming member into contact with a surface of said workpiece, and
   means for moving said elongated member in a direction away from said curved surface of said template while maintaining said elongated member in an extended position and while said workpiece is rotated, whereby said predetermined contour is generated on said workpiece surface.

6. Apparatus as defined in claim 5 wherein the length of said elongated member is at least equal to the length of said curved template surface.

* * * * *